United States Patent
Kim et al.

(10) Patent No.: US 9,581,856 B2
(45) Date of Patent: Feb. 28, 2017

(54) DISPLAY PANEL AND LIQUID CRYSTAL DISPLAY

(71) Applicant: SAMSUNG DISPLAY CO., LTD., Yongin, Gyeonggi-Do (KR)

(72) Inventors: Jong Seong Kim, Seoul (KR); Tae Hwan Kim, Seongnam-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 178 days.

(21) Appl. No.: 14/463,006

(22) Filed: Aug. 19, 2014

(65) Prior Publication Data

US 2015/0116631 A1 Apr. 30, 2015

(30) Foreign Application Priority Data

Oct. 31, 2013 (KR) .................. 10-2013-0131412

(51) Int. Cl.
  *G02F 1/1333* (2006.01)
  *G02F 1/1335* (2006.01)

(52) U.S. Cl.
  CPC .. *G02F 1/133528* (2013.01); *G02F 1/133308* (2013.01); *G02F 2001/133357* (2013.01)

(58) Field of Classification Search
  CPC ......... G02F 1/133528; G02F 1/133308; G02F 1/133504; G02F 1/133553; G02F 1/133524; G02F 2001/133331; G02F 2001/133317
  USPC .......................................................... 349/58
  See application file for complete search history.

(56) References Cited

U.S. PATENT DOCUMENTS

| | | | |
|---|---|---|---|
| 5,150,231 A * | 9/1992 | Iwamoto | G02F 1/133308 349/122 |
| 6,726,995 B2 | 4/2004 | Ishii et al. | |
| 2004/0008507 A1* | 1/2004 | Lee | G02B 6/0038 362/623 |
| 2007/0200259 A1 | 8/2007 | Nakanishi et al. | |
| 2010/0101856 A1* | 4/2010 | Yee | H01L 51/5237 174/544 |
| 2010/0171900 A1* | 7/2010 | Lee | G02B 6/0051 349/58 |
| 2011/0148784 A1* | 6/2011 | Lee | G06F 1/1601 345/173 |
| 2012/0281383 A1* | 11/2012 | Hwang | G02F 1/133308 361/807 |
| 2014/0016346 A1* | 1/2014 | Hsu | H05K 5/0017 362/606 |

FOREIGN PATENT DOCUMENTS

| | | |
|---|---|---|
| KR | 10-2007-0114473 | 12/2007 |
| KR | 10-2008-0084352 | 9/2008 |
| KR | 10-2009-0048195 | 5/2009 |
| KR | 10-2011-0094395 | 8/2011 |

* cited by examiner

*Primary Examiner* — Hoan C Nguyen
(74) *Attorney, Agent, or Firm* — F. Chau & Associates, LLC

(57) ABSTRACT

A display panel includes: an upper substrate, a lower substrate disposed under the upper substrate, a lower polarizer disposed under the lower substrate, and a step smoothing member disposed under the lower substrate and not overlapping with the lower polarizer.

16 Claims, 8 Drawing Sheets

DISPLAY PANEL AND LIQUID CRYSTAL DISPLAY

CROSS-REFERENCE TO RELATED APPLICATION

This application claims priority to Korean Patent Application No. 10-2013-0131412 filed on Oct. 31, 2013, the disclosure of which is hereby incorporated by reference herein in its entirety.

(A) TECHNICAL FIELD

The present disclosure relates to a display panel and a liquid crystal display.

(B) DISCUSSION OF THE RELATED ART

A liquid crystal display is one of the widely used flat panel displays. A liquid crystal display is a display device which may include two display panels provided with field generating electrodes, a liquid crystal layer disposed therebetween, and a substrate spacer uniformly supporting an interval between the two display panels. Liquid crystal molecules of a liquid crystal layer may be rearranged by applying voltages to two electrodes, transmittance of light passing through the liquid crystal layer may be controlled by controlling the rearrangement of the liquid crystal molecules, and consequently an image is displayed.

Among the liquid crystal displays, a liquid crystal display in which two display panels are disposed and a thin film transistor switching a voltage applied to the electrodes is formed is widely used. One display panel (hereinafter referred to as a lower panel) of the two display panels may include a plurality of wires such as a gate line and a data line, a pixel electrode formed in a pixel enclosed by the gate line and the data line, and a thin film transistor controlling a data signal transmitted to the pixel electrode. The other display panel (hereinafter referred to as an upper panel) includes a black matrix having an opening corresponding to the pixel.

The lower panel includes a driver and a wire for driving the gate line and the data line such that an area of the lower substrate is wider than the area of the upper panel. Accordingly, the lower panel has a region that is not covered by the upper panel and is exposed. The driver, etc., is disposed at the exposed region of the lower panel.

Also, polarizers are positioned at a bottom surface of the lower panel and a top surface of the upper panel. The polarizer controls polarization of light emitted from a backlight and light emitted from the display device. The area of the polarizer is smaller than the area of the lower panel. Accordingly, the lower panel has a step between the region where the polarizer is disposed and the region where the polarizer is not disposed.

SUMMARY

Exemplary embodiments of the present invention provide a display panel in which stress concentrated by a step of a lower panel in a manufacturing process of a liquid crystal display is prevented by forming a step smoothing member for compensating for a step due to partial adhesion of a polarizer to the lower panel.

A display panel according to an exemplary embodiment of the present invention includes: an upper substrate, a lower substrate disposed under the upper substrate, a lower polarizer disposed under the lower substrate and a step smoothing member disposed under the lower substrate and not overlapping with the lower polarizer.

An upper polarizer positioned on the upper substrate may be further included.

The step smoothing member may be separated from the lower polarizer.

The step smoothing member may have a melting point of more than about 150° C.

The thickness of the step smoothing member may be the same as the thickness of the lower polarizer.

The thickness of the step smoothing member may be in a range of about 100 μm to about 150 μm.

The display panel may further include a polymer cushioning material disposed at a lateral surface of the upper substrate and the lower substrate.

The polymer cushioning material may be formed through photo-hardening or thermal hardening after coating a polymer resin at the lateral surface.

The step smoothing member may continuously exist with the lower polarizer.

The step smoothing member may have a melting point of more than about 150° C.

The step smoothing member may include at least one selected from a group including polyimide, polycarbonate, polyethersulfone, polyetheretherketone, and polyphenylene sulfide.

The thickness of the step smoothing member may be the same as a thickness of the lower polarizer.

The thickness of the step smoothing member may be in a range of about 100 μm to about 150 μm.

The display panel may further include a polymer cushioning material disposed at a lateral surface of the upper substrate and the lower substrate.

The polymer cushioning material may be formed through photo-hardening or thermal hardening after coating a polymer resin at the lateral surface.

The step smoothing member may include a longitudinal portion covering both lateral surfaces of the lower polarizer, the lower substrate, and the upper substrate.

The lateral surface and a bottom of the display panel may be flat without a step.

A liquid crystal display according to an exemplary embodiment of the present invention includes: a display panel including an upper substrate, a lower substrate disposed under the upper substrate, a lower polarizer disposed under the lower substrate, and a step smoothing member disposed under the lower substrate and not overlapping with the lower polarizer and a frame fixing the display panel.

The thickness of the step smoothing member may be the same as the thickness of the lower polarizer.

The fixing frame may contact the step smoothing member to fix the display panel on the fixing frame.

A liquid crystal display according to an exemplary embodiment of the present invention includes a display panel including an upper substrate, a lower substrate disposed under the upper substrate, a lower polarizer disposed on a bottom surface of the lower substrate, an upper polarizer disposed on an upper surface of the upper substrate, and a step smoothing member disposed on the bottom surface of the lower substrate and not overlapping with the lower polarizer.

In addition, the liquid crystal display further includes a glass cover disposed on an upper surface of the upper polarizer, a supporter configured to support the display panel, in which the supporter includes a fixing frame including a first step supporting the glass cover thereon and a second step contacting the step smoothing member and supporting the display panel thereon, a lower frame contacting the fixing frame, and a lateral frame including a first portion and a second portion bent at an end portion of the first portion of the lateral frame. An inner side of the first portion of the lateral frame contacts an outer side of the lower frame and the second portion of the lateral frame contacts an upper surface of the glass cover.

As described above, the display panel and the liquid crystal display of exemplary embodiments of the present invention form the step smoothing member compensating the step caused by the partial adhesion of the lower substrate and the lower polarizer such that the damage due to the stress concentration generated by the step of the lower substrate in the manufacturing process of the liquid crystal display may be prevented. Also, by forming the polymer cushioning member at the lateral surface where the upper substrate and the lower substrate are adhered, the possibility of damage to the lower substrate caused by the lateral impact applied in the panel manufacturing process is reduced.

BRIEF DESCRIPTION OF THE DRAWINGS

Exemplary embodiments of the present invention can be understood in more detail from the following detailed description taken in conjunction with the accompanying drawings in which.

DETAILED DESCRIPTION OF EXEMPLARY EMBODIMENTS

Figure 1:
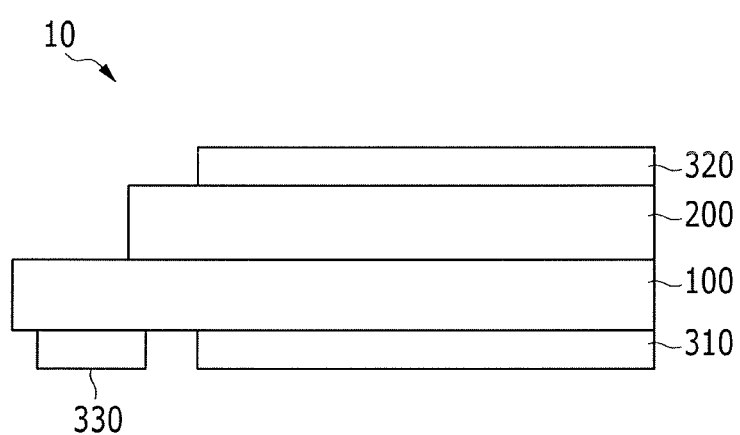
FIG. 1 is a cross-sectional view of a display panel according to an exemplary embodiment of the present invention.

Exemplary embodiments of the present invention will be described more fully hereinafter with reference to the accompanying drawings, in which exemplary embodiments of the invention are shown.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

Now, a display panel and a liquid crystal display according to an exemplary embodiment of the present invention will be described with reference to accompanying drawings.

FIG. 1 is a cross-sectional view of a display panel according to an exemplary embodiment of the present invention. Referring to FIG. 1, the display panel 10 includes a lower substrate 100, an upper substrate 200, a lower polarizer 310 and an upper polarizer 320. The lower polarizer 310 and the upper polarizer 320 are respectively adhered to the lower substrate 100 and the upper substrate 200.

The lower substrate 100 and the upper substrate 200 are coupled with a predetermined interval, and a liquid crystal layer is positioned therebetween. By applying a voltage to the lower substrate 100 and the upper substrate 200, an electric field is generated to the liquid crystal layer and an intensity of the electric field is changed to rearrange liquid crystal molecules of the liquid crystal layer, and thereby the display panel 10 displays an image.

The lower substrate 100 includes a plurality of pixel areas. A gate line extending in, for example, a first direction, a data line extending, for example, in a second direction intersecting the first direction and crossing and insulated from the gate line, and a pixel electrode are formed in each pixel area. Also, each pixel includes a thin film transistor electrically connected to the gate line and the data line corresponding to the pixel electrode. The thin film transistor provides a driving signal at a side of the corresponding pixel electrode.

The lower substrate 100 may be made of, for example, transparent glass, quartz, or plastic. Further, in an exemplary embodiment, the lower substrate 100 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof.

The data lines and gate lines may each be formed of, for example, at least one of copper (Cu), silver (Ag), chromium (Cr), molybdenum (Mo), aluminum (Al), titanium (Ti), manganese (Mn), nickel (Ni), gold (Au), palladium (Pd), platinum (Pt), neodymium (Nd), beryllium (Be), niobium (Nb), iron (Fe), selenium (Se), tantalum (Ta), cobalt (Co), and alloys thereof.

The pixel electrode may be formed of, for example, indium tin oxide (ITO), indium zinc oxide (IZO), cadmium tin oxide (CTO), aluminum zinc oxide (AZO), indium tin zinc oxide (ITZO) zinc oxide, cadmium oxide (CdO), hafnium oxide (HfO), indium gallium zinc oxide (InGaZnO), indium gallium zinc magnesium oxide (InGaZnMgO), indium gallium magnesium oxide (InGaMgO) or indium gallium aluminum oxide (InGaAlO).

Also, a driver may be provided at one side of the lower substrate 100. The driver receives various signals from the outside, and outputs a driving signal driving the display panel 10 to a side of the thin film transistor in response to the input various control signals. The driver is formed on a surface of the lower substrate 100 that is not combined with the upper substrate 200, such as, on the exposed surface of the lower substrate 100.

For example, the upper substrate 200 may include RGB color filters realizing a predetermined color by using light provided from a backlight unit on one side, and a RGB common electrode formed on the color filter and facing the pixel electrode. Here, the RGB color filter may be formed through, for example, a thin film process. In an exemplary of the present invention, the color filter is formed on the upper substrate 200, but exemplary embodiments are not limited thereto. For example, alternatively in an embodiment, the color filter may be formed on the lower substrate 100. Also, alternatively, in an embodiment, the common electrode of the upper substrate 200 may be formed instead in the lower substrate 100.

The upper substrate 200 may be made of, for example, transparent glass, quartz, or plastic. Further, in an exemplary embodiment, the upper substrate 200 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof.

The lower polarizer 310 is attached to a bottom surface of the lower substrate 100. The lower polarizer 310 polarizes the light from the backlight unit in one direction and directs the polarized light to the display panel 10.

The upper polarizer 320 is attached to a top surface of the upper substrate 200. The upper polarizer 320 polarizes the light passing through the display panel 10.

A driver and wires to respectively drive the gate line and the data line should be formed in the lower substrate 100 such that the area of the lower substrate 100 is wider than the area of the upper substrate 200.

The lower polarizer 310 of the lower substrate 100 is only formed at a portion of the lower substrate 100. That is, the lower polarizer 310 is formed only under the region where the lower substrate 100 is adhered to the upper substrate 200, but is not formed under the region where the lower substrate 100 is not adhered to the upper substrate 200. The driver is formed on the lower substrate 100 that is adhered to the upper substrate 200 and is exposed. As heat applied in the adhering process of the driver is high enough to melt the lower polarizer 310, the lower polarizer 310 is not formed under the region where the driver is formed.

A step smoothing member 330 is positioned at the region where the lower polarizer 310 is not adhered at the bottom surface of the lower substrate 100. The step smoothing member 330 is positioned to not overlap the lower polarizer 310.

A thickness of the step smoothing member 330 may be the same as the thickness of the lower polarizer 310 adhered to the lower substrate 100. Accordingly, in the driver adhering process and the panel coupling process, the possibility of damage to the display panel 10 is prevented by removing the step between the region where the lower polarizer 310 is adhered to the lower substrate 100 and the region where the lower polarizer 310 is not adhered to the lower substrate 100. In an exemplary embodiment of the present invention, the thickness of the step smoothing member 330 may be in a range of, for example, about 100 µm to about 150 µm. The thickness of the step smoothing member 330 may be changed according to the thickness of the lower polarizer 310 adhered to the lower substrate 100.

In an exemplary embodiment of the present invention, the step smoothing member 330 may be positioned, for example, to be separated from the lower polarizer 310. That is, a space may exist between the step smoothing member 330 and the lower polarizer 310. For example, in an embodiment, the step smoothing member 330 may be formed after adhering the lower polarizer 310 to the lower substrate 100. Alternatively, in an embodiment, the step smoothing member 330 may be firstly formed before adhering the lower polarizer 310 to the lower substrate 100.

The material of the step smoothing member 330 is one that is not deformed by the heat applied in the driver adhering process. If the material of the step smoothing member 330 has a melting point of more than about 150° C., the material may be used without limitation. For example, the step smoothing member 330 may be a heat-resistant polymer that has a glass transition temperature of more than about 150° C. The step smoothing member 330 may include, for example, at least one material selected from a group including polyimide, polycarbonate, polyethersulfone, polyetheretherketone, and polyphenylene sulfide. However, the material of the step smoothing member 330 is not limited to the above-mentioned polymers. Rather, any suitable material that is not deformed at a temperature of more than about 150° C. is usable without limitation for the step smoothing member 330.

Figure 4:
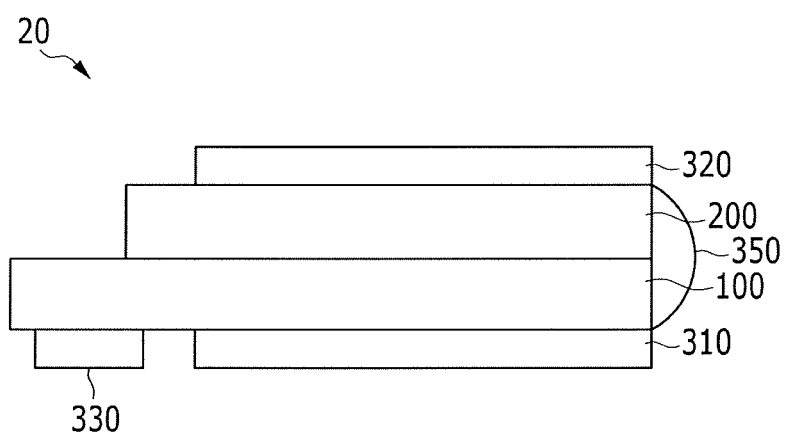
FIG. 4 is a cross-sectional view of a display panel according to an exemplary embodiment of the present invention.

As discussed later herein in connection with FIG. 4, in an embodiment of the present invention, the display panel may further include, for example, a polymer cushioning material 350 at one lateral surface of the lower substrate 100 and the upper substrate 200 at an area of the display panel where the upper substrate 200 and the lower substrate 100 are coupled to each other. One lateral surface where the polymer cushioning material 350 is formed is a side where the step smoothing member 330 is not formed, such as, a side of the display panel where the lower substrate 100 and the upper substrate 200 are coupled on the same line without a separate space. That is, the polymer cushioning material 350 may be formed at the side of the display panel opposite to the side of the display panel on which the driver is formed.

The polymer cushioning material 350 is formed through, for example, photo-hardening or thermal hardening by coating a polymer resin at the lateral surface. The polymer resin may be, for example, the photo-hardening resin or the thermal hardening resin without limitation. The polymer cushioning material 350 prevents damage to the lower substrate 100 by a lateral impact.

The display panel according to an exemplary embodiment of the present invention includes the step smoothing member 330 having the same thickness as the lower polarizer 310 positioned at the bottom surface of the lower substrate 100, thereby reducing damage to the lower substrate 100 in the manufacturing process of the display panel 10.

Figure 2:
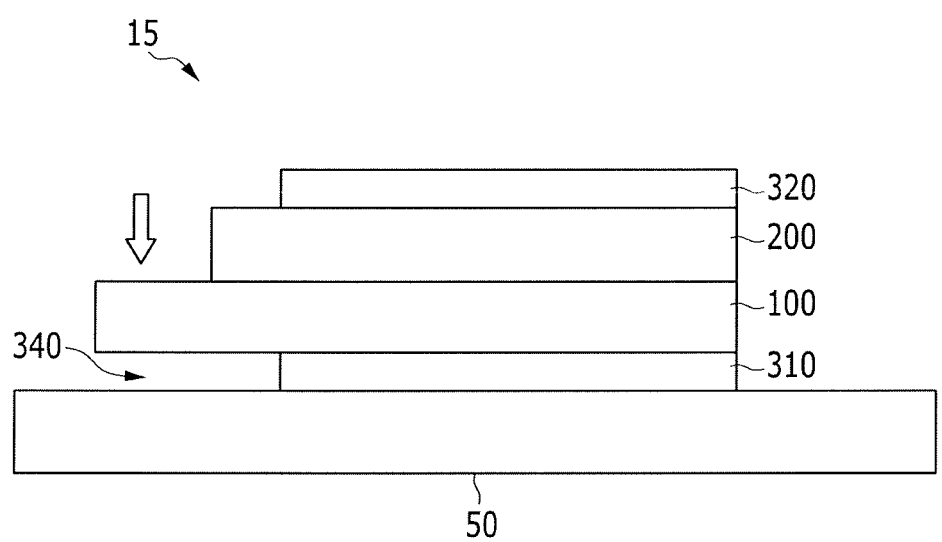
FIG. 2 is a cross-sectional view of a display panel according to a comparative example.

FIG. 2 is a view of a display panel according to a comparative example of the present invention. As shown in FIG. 2, a lower substrate 100 of the display panel 15 has a gap region 340 where a lower polarizer 310 is not adhered to the lower substrate 100. The gap region 340 is a region below the lower substrate 100 on which the driver 50 is adhered and the lower polarizer 310 is not adhered as the deformation of the lower polarizer 310 is generated by the heat applied when adhering the driven In the process of adhering the driver to the display panel 15, a pressure is applied to adhere the driver after forming an adhesive on the lower substrate 100. When adhering the driver, the pressure is applied in a direction indicated by the arrow shown in FIG. 2. The pressure applied in the driver adhering process is transmitted to the gap region 340 of the lower substrate 100, and the pressure of the driver adhesion is transmitted to the lower substrate 100 because a member capable of absorbing the pressure does not exist in the gap region 340. However, in the region where the lower polarizer 310 is adhered to the lower substrate 100, the applied pressure is absorbed by the lower polarizer 310. Accordingly, by the step between the region where the lower polarizer 310 is adhered to the lower substrate 100 and the region where the lower polarizer 310 is not adhered to the lower substrate 100, the lower substrate 100 may be damaged in the driver adhering process.

However, in the display panel according to an exemplary embodiment of the present invention, the step smoothing member 330 exists at the bottom surface of the lower substrate 100 such that the step caused by the partial adhesion of the lower polarizer 310 of the lower substrate 100 is removed. Accordingly, the possibility of damage to the lower substrate 100 is reduced in the driver adhering process.

Figure 3:
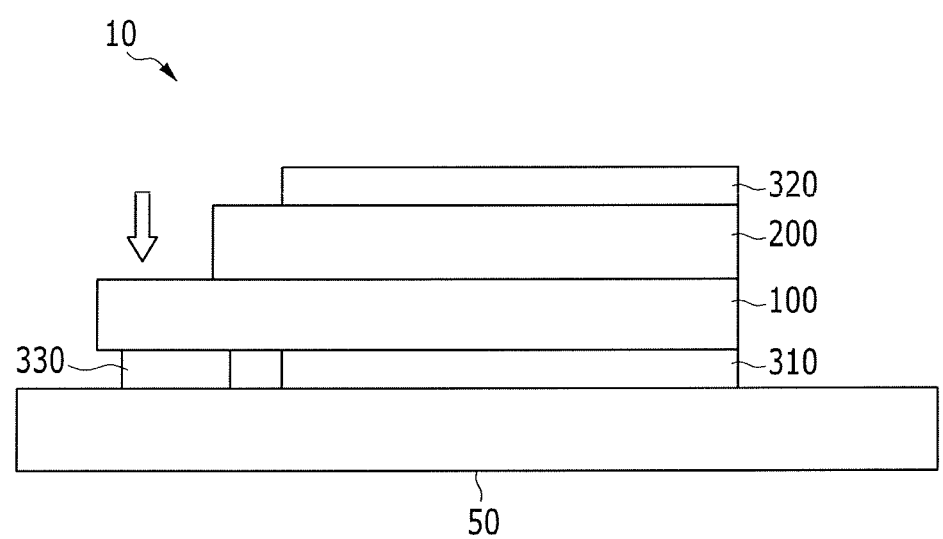
FIG. 3 is a cross-sectional view of a display panel according to an exemplary embodiment of the present invention.

FIG. 3 is a view of a driver adhesion process of a display panel according to an exemplary embodiment of the present invention.

Referring to FIG. 3, the pressure applied on the lower substrate 100 when adhering the driver 50 is uniformly absorbed by the lower polarizer 310 and the step smoothing member 330 having the same thickness as the lower polarizer 310. That is, as the step does not exist at the lower substrate 100, the pressure is uniformly dispersed and the damage to the lower substrate 100 by the pressure applied in the driver adhesion process may be prevented.

Also, besides the driver adhesion process, when moving the display panel 10 for other processes, the lower substrate 100 is stably positioned without the step, the display panel 10 is relatively easily moved, and the damage possibility thereto is reduced.

Next, a display panel according to an exemplary embodiment of the present invention will be described with reference to FIG. 4. The display panel 20 of the present exemplary embodiment is similar to the display panel 10 of FIG. 1, except that display panel 20 may further include, for example, a polymer cushioning material 350 at the lateral surface of the upper substrate 200 and the lower substrate 100. A detailed description of the similar constituent elements is omitted. The polymer cushioning material 350 softens an impact applied at the lateral surface of the display panel 20 in the moving process and the other processes of the display panel 20. Accordingly, breakage of the display panel 20 by a lateral impact is prevented. The formation position of the polymer cushioning material 350 is a portion where the edges of the lower substrate 100 and the upper substrate 200 accord and are adhered to each other without the space, such as the lateral surface of the display panel 20 where the driver is not formed.

Figure 5:
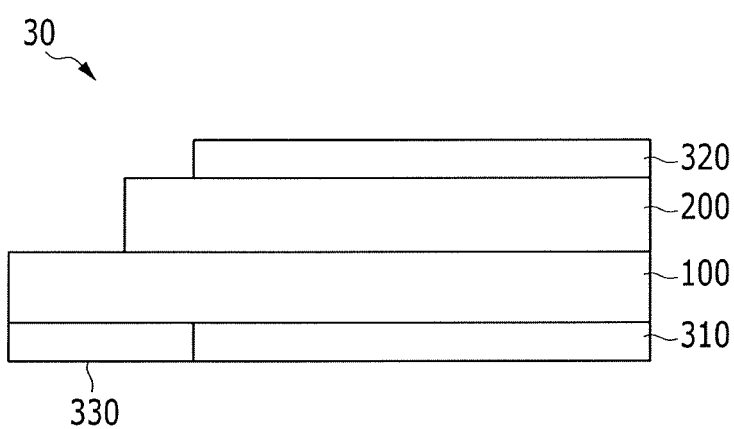
FIG. 5 is a cross-sectional view of a display panel according to an exemplary embodiment of the present invention.

A display panel according to an exemplary embodiment of the present invention will be described with reference to FIG. 5. FIG. 5 is a cross-sectional view of a display panel according to an exemplary embodiment of the present invention. Referring to FIG. 5, the liquid crystal display according to the present exemplary embodiment is similar to the liquid crystal display shown in FIG. 1 and FIG. 4. A detailed description of the similar constituent elements is omitted.

Referring to FIG. 5, the display panel 30 includes a lower substrate 100, an upper substrate 200, a lower polarizer 310 and an upper polarizer 320. The lower polarizer 310 and the upper polarizer 320 are respectively adhered to the lower substrate 100 and the upper substrate 200. The step smoothing member 330 is positioned at the bottom surface of the lower substrate 100, at a region where the lower polarizer 310 is not adhered to the lower substrate 100.

However, the step smoothing member 330 of the display panel 30 according to the present exemplary embodiment is not separated from the lower polarizer 310 but rather is continuously formed therewith.

Figure 6:
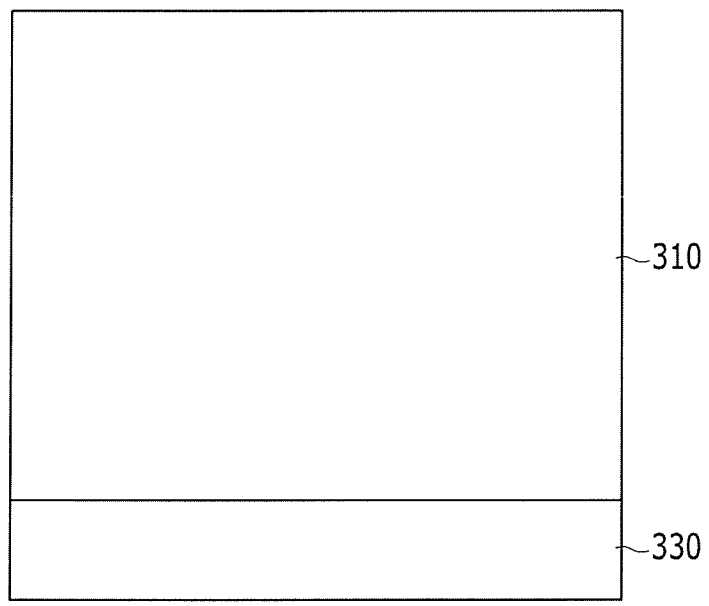
FIG. 6 is a view of a lower polarizer and a step smoothing member according to an exemplary embodiment of the present invention.

For example, in an embodiment, the step smoothing member 330 and the lower polarizer 310 may have, for example, one continuous plate shape. FIG. 6 is a view of the lower polarizer 310 and the step smoothing member 330 according to an exemplary embodiment of the present invention.

Referring to FIG. 6, the lower polarizer 310 and the step smoothing member 330 are formed of, for example, one continuous plate shape. The constituent materials of the region of the lower polarizer 310 and the region of the step smoothing member 330 are different from each other.

The material of the lower polarizer 310 is not limited. For example, the lower polarizer 310 may be made of triacetyl cellulose.

However, in the case of the step smoothing member 330, a material that is not deformed by the heat applied in the driver adhesion process should be used.

For example, the step smoothing member 330 may be a thermal-resistant polymer having a glass transition temperature of more than about 150° C. However, the material of the step smoothing member 330 is not limited to the above-mentioned polymer, but rather any suitable material that is not deformed at a temperature of more than about 150° C. may be used. For example, the step smoothing member 330 may include at least one material selected from a group including polyimide, polycarbonate, polyethersulfone, polyetheretherketone, and polyphenylene sulfide.

As shown in FIG. 6, the display panel according to an exemplary embodiment of the present invention may be formed by, for example, a method of adhering one continuous plate including the lower polarizer 310 and the step smoothing member 330 to the lower substrate 100. That is, the step smoothing member 330 and the lower polarizer 310 are simultaneously formed in a single process.

The step smoothing member 330 and the lower polarizer 310 are formed of one continuous plate such that the thicknesses of the step smoothing member 330 and the lower polarizer 310 are the same. The thicknesses of the step smoothing member 330 and the lower polarizer 310 are in a range of, for example, about 100 μm to about 150 μm, but exemplary embodiments of the present invention are not limited thereto.

The display panel in which the step smoothing member 330 and the lower polarizer 310 are disposed as one continuous plate may also include, for example, a polymer cushioning material 350 (See FIG. 4) at one lateral surface of the lower substrate 100 and the upper substrate 200 at an area of the display panel where the lower substrate 100 and the upper substrate 200 are adhered to each other. One lateral surface of the display panel where the polymer cushioning material 350 is formed is the portion where the step smoothing member 330 is not formed, such as, a lateral surface of the display panel where the lower substrate 100 and the upper substrate 200 are adhered to each other without the exposed space. The polymer cushioning material 350 is formed through, for example, the photo-hardening or the thermal hardening after coating the polymer resin at the lateral surface.

Next, a display panel according to an exemplary embodiment of the present invention will be described.

Figure 7:
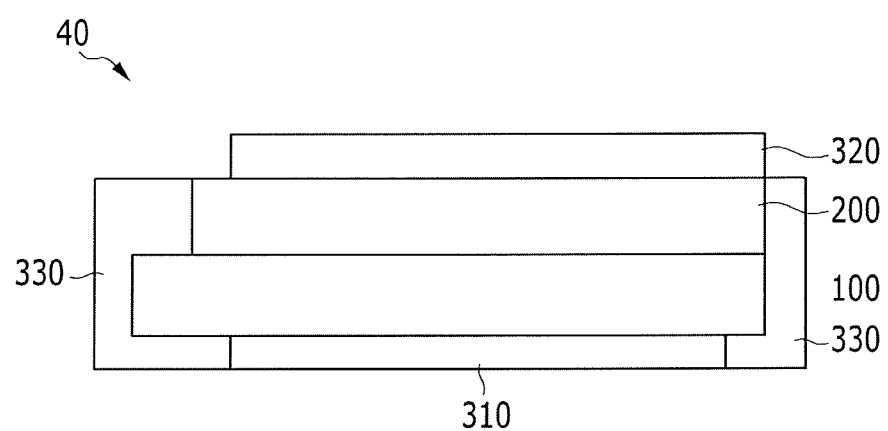
FIG. 7 is a cross-sectional view of a display panel according to an exemplary embodiment of the present invention.

FIG. 7 is a cross-section view of a display panel according to an exemplary embodiment of the present invention. Like FIG. 1 to FIG. 5, the cross-sectional view is in a direction facing the region where the driver of the lower substrate is formed at a left side.

Referring to FIG. 7, the display panel of the liquid crystal display according to the present exemplary embodiment is similar to the display panel of the liquid crystal display shown in FIG. 1 and FIG. 5. A detailed description for the similar constituent elements is omitted.

Referring to FIG. 7, the display panel 40 includes a lower substrate 100, an upper substrate 200, a lower polarizer 310 and an upper polarizer 320. The lower polarizer 310 and the upper polarizer 320 are respectively formed at the lower substrate 100 and the upper substrate 200.

However, in the present exemplary embodiment, the size of the lower substrate 100 is larger than the size of the upper substrate 200. In addition, the lower substrate 100 includes a region that does not contact the upper substrate 200 and is exposed, as well as the region that is adhered to the upper substrate 200. The exposed regions are formed at both sides of the lower substrate 100.

The lower polarizer 310 is adhered to the bottom surface of the lower substrate 100. The adhesion area of the lower polarizer 310 is similar to the size of the upper substrate 200. Accordingly, in the lower substrate 100, the regions where the lower polarizer 310 is not adhered and is exposed are disposed at both sides of the lower substrate 100.

The upper polarizer 320 is positioned at the top surface of the upper substrate 200.

The step smoothing member 330 is formed at the region of the bottom surface of the lower substrate 100 where the lower polarizer 310 is not adhered. The step smoothing member 330 covers an entire exposed portion of the lower substrate 100, and is formed of a shape covering a lateral surface region where the lower substrate 100 and the upper substrate 200 are adhered to each other. The step smoothing member 330 fills the lateral steps that are generated by the size difference of the upper polarizer 320, the upper substrate 200, the lower substrate 100, and the lower polarizer 330.

The step smoothing member 330 is also formed at the lateral surface of the upper substrate 200 and the lower substrate 100 at an area of the display panel 40 where the lower substrate 100 and the upper substrate 200 are adhered without the separate space on the same line, thereby smoothing the impact in the lateral surface direction. That is, the step smoothing member 330 absorbs the impact in the lateral direction as well as smoothing the lateral step on which the driver is formed and the step of the lower substrate 100, thereby preventing damage to the panel.

A longitudinal length of the step smoothing member 330 is the same as a distance from the bottom surface of the lower polarizer 310 to the bottom surface of the upper polarizer 320.

An outer side of the step smoothing member 330 is parallel without a bent portion, and an inner side of the step smoothing member 330 contacting the display panel 40 has a bent portion that is coupled to the shape of the constituent elements of the display panel 40.

The thickness of the step smoothing member 330 positioned under the lower substrate 100 may be the same as the thickness of the lower polarizer 310 attached to the lower substrate 100. The thickness of the step smoothing member 330 may be in the range of, for example, about 100 μm to about 150 μm.

The step smoothing member 330 may be, for example, a heat-resistant polymer having a glass transition temperature of more than about 150° C. However, the material of the step smoothing member 330 is not limited to the above-mentioned polymer. Rather, any suitable material that is not deformed at a temperature of more than about 150° C. is possible without limitation for use as the material for the step smoothing member 330. The step smoothing member 330 may include, for example, at least one material selected from a group including polyimide, polycarbonate, polyethersulfone, polyetheretherketone, and polyphenylene sulfide.

Figure 8:
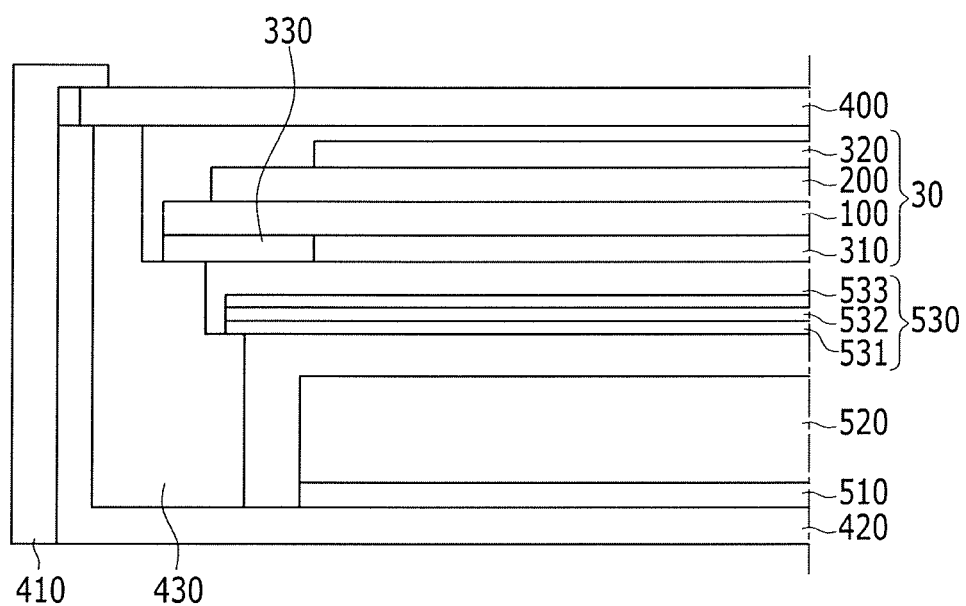
FIG. 8 is a cross-sectional view of a liquid crystal display according to an exemplary embodiment of the present invention.

Next, a liquid crystal display according to an exemplary embodiment of the present invention will be described with reference to FIG. 8. FIG. 8 is a cross-sectional view of a liquid crystal display according to an exemplary embodiment of the present invention.

Referring to FIG. 8, a liquid crystal display according to an exemplary embodiment of the present invention includes a display panel displaying images, a supporter supporting the display panel, and a backlight unit formed at a rear surface of the display panel and providing light.

The description of the display panel of the present exemplary embodiment is the same as above in connection with the display panel 30 of FIG. 5 and thus will be assigned the same reference numeral "30" herein. That is, the display panel 30 of the present exemplary embodiment includes a lower substrate 100, an upper substrate 200, an upper polarizer 320 on the upper substrate 200, a lower polarizer 310 under the lower substrate 100, and a step smoothing member 330 formed under the lower substrate 100 and having the same thickness as the lower polarizer 310. A detailed description of the similar constituent elements is omitted. However, it is noted that exemplary embodiments of the present invention are not limited thereto and that alternatively, the display panels of FIG. 1, 4, 6, or 7 may be used instead in connection with the liquid crystal display of the present exemplary embodiment.

The supporter supporting the display panel 30 includes, for example, a lower frame 420, a lateral frame 410, and a fixing frame 430. The lower frame 420, the lateral frame 410, and the fixing frame 430 may be made of, for example, a plastic.

The lateral frame 410 contacts the outer side of the lower frame 420 and the inner side of the lower frame 420 contacts the fixing frame 430.

The fixing frame 430 has a plurality of steps to fix each of the constituent elements. A cover glass 400 is positioned at the uppermost step of the fixing frame 430. The bottom surface of the cover glass 400 contacts the fixing frame 430, and the top surface thereof contacts and is fixed to the protrusion of the lateral frame 410. In FIG. 8, the lateral frame 410 is, for example, bent to be positioned on the cover glass 400. However, according to an exemplary embodiment, the lateral frame 410 may, for example, only be formed on the bottom surface of the cover glass 400, and the cover glass 400 may cover the lateral frame 410 such that the cover glass 400 may only be positioned on the top surface of the lateral frame 410. According to an exemplary embodiment, the cover glass 400 may be omitted.

A second step of the fixing frame 430 contacts the display panel 30, thereby fixing the display panel 30. The fixing frame 430 contacts the step smoothing member 330 of the display panel 30 to be fixed. The shape and the material of the step smoothing member 330 are the same as described above.

In FIG. 8, the step smoothing member 330 is not separated from the lower polarizer 310 but rather in the present exemplary embodiment, the lower polarizer 310 and the step smoothing member 330 are formed, for example, as one plate which is adhered to the lower substrate 100. However, the step smoothing member 330 may be formed of, for example, a shape that is separated from the lower polarizer 310. Also, the step smoothing member 330 may be formed of, for example, a shape covering all the lateral surfaces of the lower polarizer 310, the lower substrate 100, and the upper substrate 200.

A third step of the fixing frame 430 contacts an optical sheet 530 to fix the optical sheet 530. The optical sheet 530 includes, for example, a diffuser sheet 531 diffusing a light, a light collecting sheet 532 collecting the diffused light, and a protecting sheet 533 to protect a light collecting pattern formed on the light collecting sheet 532.

A reflection sheet 510 and a light guide 520 are positioned under the optical sheet 530 and on the lower frame 420.

The light guide 520 converts point light generated from a backlight unit disposed at one side of the light guide 520 into surface light. The light guide 520 may be made of, for example, a resin based material such as polymethylmethacrylate (PMMA), a polyethylene terephthalate (PET) resin, a polycarbonate (PC) resin, a cyclic olefin copolymer (COC) resin, and a polyethylene naphthalate (PEN) resin.

The reflection sheet 510 is disposed under the light guide 520, thereby reflecting the light progressing under the light guide 520 in the direction of the display panel 30. For example, in an exemplary embodiment, reflection sheet 510 may be formed of, polyethylene terephthalate (PET) or aluminum. Alternatively, in an exemplary embodiment, the reflection sheet 510 may include other materials such as, for example, polybutylene terephthalate (PBT) or a resin such as polycarbonate (PC) blended in polyethylene terephthalate (PET) or polybutylene terephthalate (PBT).

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A display panel comprising:
    an upper substrate;
    a lower substrate disposed under the upper substrate;
    a lower polarizer disposed under the lower substrate; and
    a step smoothing member disposed the lower substrate and not overlapping with the lower polarizer,
    wherein side surfaces of the step smoothing member are spaced apart from a frame of the display panel and the step smoothing member has a uniform thickness over its entire length and the uniform thickness of the step smoothing member is the same as a thickness of the lower polarizer, and
    wherein the thickness of the step smoothing member is in a range of about 100 µm to about 150 µm.

2. The display panel of claim 1, further comprising an upper polarizer disposed on the upper substrate.

3. The display panel of claim 2, wherein the step smoothing member is spaced apart from the lower polarizer.

4. The display panel of claim 3, wherein the step smoothing member has a melting point of more than about 150° C.

5. The display panel of claim 2, wherein the step smoothing member continuously exists with the lower polarizer.

6. The display panel of claim 5, wherein the step smoothing member has a melting point of more than about 150° C.

7. The display panel of claim 6, wherein the step smoothing member comprises at least one selected from a group including polyimide, polycarbonate, polyethersulfone, polyetheretherketone, and polyphenylene sulfide.

8. The display panel of claim 1, wherein the display panel further includes a polymer cushioning material disposed at a lateral surface of the upper substrate and the lower substrate.

9. The display panel of claim 8, wherein the polymer cushion is spaced apart from the step smoothing member.

10. The display panel of claim 9, wherein the display panel further includes a polymer cushioning material disposed at a lateral surface of the upper substrate and the lower substrate.

11. The display panel of claim 1, wherein a lateral surface of the lower polarizer and a bottom of the display panel are flat without a step.

12. A liquid crystal display comprising:
    a display panel including an upper substrate, a lower substrate disposed under the upper substrate, a lower polarizer disposed under the lower substrate, and a step smoothing member disposed under the lower substrate and not overlapping with the lower polarizer; and
    a frame fixing the display panel,
    wherein side surfaces of the step smoothing member are spaced apart from the fixing frame and the step smoothing member has a uniform thickness over its entire length and the uniform thickness of the step smoothing member is the same as a thickness of the lower polarizer, and
    wherein the thickness of the step smoothing member is in a range of about 100 µm to about 150 µm.

13. The liquid crystal display of claim 12, wherein the step smoothing member is spaced apart from the lower polarizer.

14. The liquid crystal display of claim 12, wherein the fixing frame contacts the step smoothing member at a bottom surface thereof to fix the display panel on the fixing frame.

15. A liquid crystal display comprising:
    a display panel including an upper substrate, a lower substrate disposed under the upper substrate, a lower polarizer disposed on a bottom surface of the lower substrate, an upper polarizer disposed on an upper surface of the upper substrate, and a step smoothing member disposed on the bottom surface of the lower substrate and not overlapping with the lower polarizer;
    a glass cover disposed on an upper surface of the upper polarizer;
    a supporter configured to support the display panel, wherein the supporter includes a fixing frame including a first step supporting the glass cover thereon and a second step contacting the step smoothing member and supporting the display panel thereon, a lower frame contacting the fixing frame, and a lateral frame including a first portion and a second portion bent at an end portion of the first portion of the lateral frame,
    wherein an inner side of the first portion of the lateral frame contacts an outer side of the lower frame and wherein the second portion of the lateral frame contacts an upper surface of the glass cover,
    wherein side surfaces of the step smoothing member are spaced apart from the fixing frame and the step smoothing member has a uniform thickness over its entire length and the uniform thickness of the step smoothing member is the same as a thickness of the lower polarizer, and
    wherein a thickness of the step smoothing member is in a range of about 100 µm to about 150 µm.

16. The liquid crystal display of claim 15, further comprising:
    an optical sheet including a diffuser sheet configured to diffuse a light, a light collecting sheet disposed on the diffuser sheet and configured to collect the diffused light and a protecting sheet configured to protect a light collecting pattern formed on the light collecting sheet;
a reflection sheet disposed underneath the optical sheet and on the lower frame a light guide disposed between the optical sheet and the reflection sheet, and wherein the fixing frame further includes a third step which is configured to support the optical sheet thereon.

\* \* \* \* \*